April 14, 1953   B. B. KNOWLES ET AL   2,634,655
SPECTACLE HINGE STRUCTURE
Filed Oct. 22, 1949
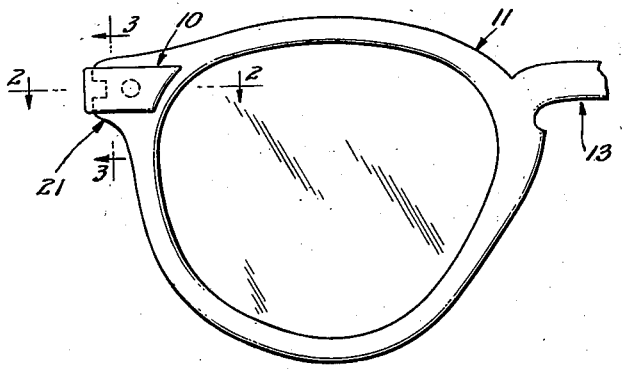
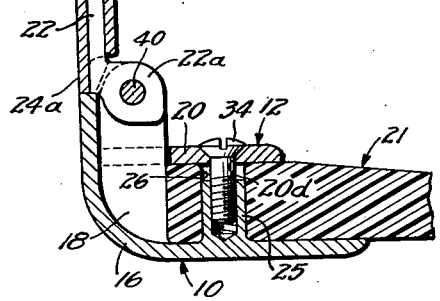
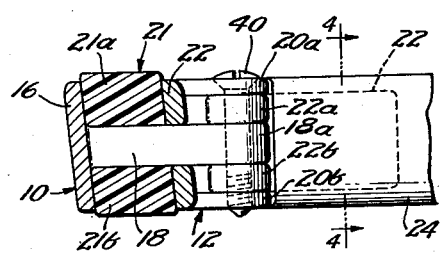
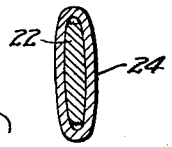
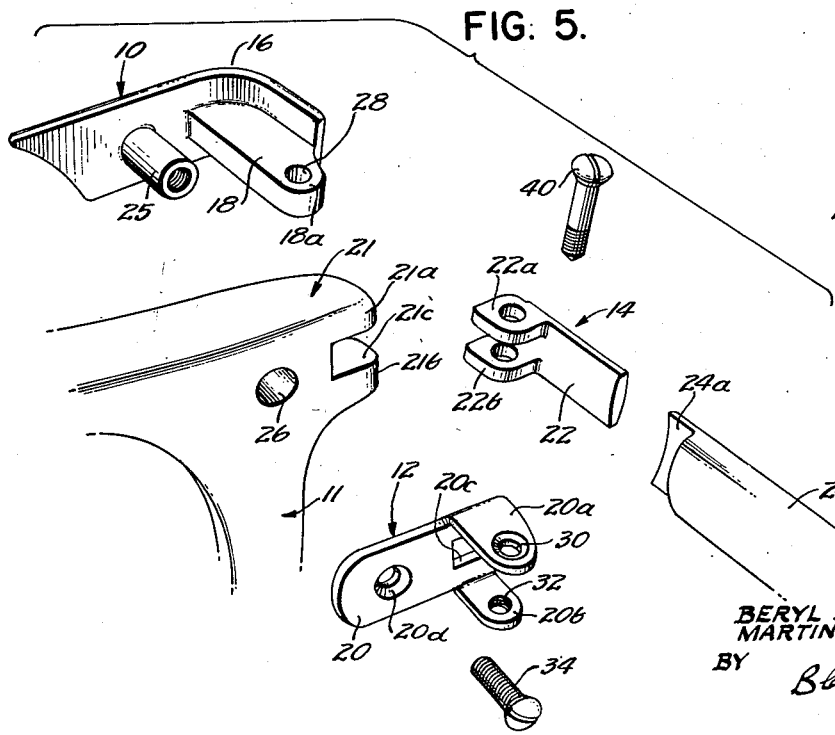
INVENTOR
BERYL B. KNOWLES
MARTIN B. SINGER
BY
Blair & Black
ATTORNEYS Patented Apr. 14, 1953

2,634,655

UNITED STATES PATENT OFFICE 2,634,655

SPECTACLE HINGE STRUCTURE

Beryl B. Knowles, Attleboro Falls, Mass., and Martin B. Singer, New York, N. Y., assignors to Bay State Optical Company, Attleboro, Mass.

Application October 22, 1949, Serial No. 123,048

4 Claims. (Cl. 88—53)

This invention relates to the hinge structure of a non-metallic eyeglass frame.

Briefly, the hinge structure includes three interconnected metal fittings, generally indicated at 10, 12 and 14, which hingedly connect the temple to the endpiece of a non-metallic eyeglass frame. Fitting 10 includes a cover plate 16 and a tongue portion 18. Fitting 12 includes a rear plate 20 having a pair of knuckles formed thereon extending rearwardly therefrom and is connected to fitting 10 by a screw extending through a hole in the endpiece portion 21. Tongue portion 18 extends through a slot in the endpiece 21 of the frame and thence through a slot in rear plate 14 to align its hinge knuckle 18a with the hinge knuckles on rear plate 12. Fitting 14 includes a plate 22 having a pair of hinge knuckles extending inwardly therefrom, plate 22 being connected to the forward end of temple 24. The hinge knuckles on fittings 10, 12 and 14 are pivotally connected by a screw to hingedly mount temple 24 on endpiece 21.

One of the objects of this invention is to provide hinge structure for a non-metallic eyeglass frame which will be simple, practical and thoroughly durable. Another object is to provide structure of the above type which will be sturdy and well able to withstand continuous hard usage. Another object is to provide structure of the above type which will be neat and attractive in appearance. Another object is to provide structure of the above type whose manufacture will be economical both from the standpoint of labor and materials used. A further object is to provide structure of the above type in which the structural elements are so disposed as to attain a high degree of strength without heavy construction. A still further object is to provide structure of the above type in which the metal fittings are reliably secured to a non-metallic eyeglass frame. Other objects will be in part obvious and in part pointed out hereinafter.

The invention accordingly consists in the features of construction, combinations of elements, and arrangements of parts, as will be exemplified in the structure to be hereinafter described, and the scope of the application which will be indicated in the following claims.

In the accompanying drawings, in which is shown one of the various possible embodiments of this invention, Figure 1 is a front elevation of a portion of a non-metallic eyeglass frame having the hinge structure mounted thereon;

Figure 2 is a horizontal section on an enlarged scale taken on the line 2—2 of Figure 1;

Figure 3 is a vertical section on an enlarged scale taken on the line 3—3 of Figure 1;

Figure 4 is a vertical section taken on the line 4—4 of Figure 3; and

Figure 5 is an exploded perspective view on an enlarged scale of the endpiece portion of the frame shown in Figure 1.

Similar reference characters refer to similar parts throughout the several views of the drawings.

It might here be noted that reference hereinafter to an "outward" direction signifies a direction to the left or right of the bridge of an eyeglass frame in the direction of the temples, while the term "inward" denotes a direction toward the bridge from one of the temples. A "rearward" direction refers to a direction toward the face of the wearer, whereas the term "forward" denotes the opposite direction. An "upward" direction refers to a direction upwardly from the face of the wearer, while a "downward" direction is opposite thereto.

As conducive to a clearer understanding of certain features of this invention, it might here be pointed out that when making eyeglass frames from a non-metallic material such as zylonite or the like, it is necessary to form the hinge structures connecting the temples to the frame front from metal in order to form hinge structures which can absorb the strains normally applied to this portion in an eyeglass frame when it is in use. Considerable difficulty has been experienced both in connecting the metal fittings forming the hinge structure to the eyeglass frame and in forming a connection between the metal parts which is strong and durable. The hinge portion of and its connection to the endpiece portion of a non-metallic eyeglass frame is particularly vulnerable because at times the temples of a frame are excessively spread, and at other times a frame is swung or rotated by its temple by many users. It is accordingly another object of this invention to provide an eyeglass frame in which a strong and durable connection is formed between the metal hinge fittings and the eyeglass frame and also between the fittings themselves.

Referring now to the drawings in detail and to Figure 1 in particular, a portion of a non-metallic eyeglass frame is shown which includes a rim, bridge and endpiece, generally indicated at 11, 13 and 21, respectively. The forward face (Figure 2) of endpiece 21 curves rearwardly as it is followed outwardly, and cover plate 16 (Figure 2) is shaped to fit this face of the endpiece. A tongue portion 18 is secured in any suitable manner such as by soldering to the inner surface of the curved and rearwardly extending portion of plate 16 and reinforces cover plate 16 to form a strong and durable fitting. Plate 16 also has an internally threaded barrel 25 (Figures 2 and 5) soldered thereto and extending rearwardly therefrom for securing fitting 10 to fitting 12 and endpiece 21, all as will be described more fully hereinafter.

As is best shown in Figure 5, endpiece 21 is provided with a slot 21c extending horizontally through the end thereof and a hole 26 adjacent rim 11. The thickness of slot 21c and the diameter of hole 26 are slightly greater than the thickness of tongue portion 18 and the diameter of barrel 25. When cover plate 16 abuts against the front of endpiece 21, barrel 25 is positioned in hole 26 and tongue portion 18 in slot 21c. It will be noted that tongue 18 is of sufficient length so that the knuckle 18a on its rear end is positioned rearwardly of endpiece 21 when the fitting 10 is mounted on endpiece 21.

Fitting 12 includes a plate 20 having a pair of knuckles 20a and 20b thereon extending rearwardly from the outer end portions of its upper and lower edges. Plate 20 also has a slot 20c extending inwardly from its outer end and a hole 20d. Tongue portion 18 on fitting 10 extends through slot 20c when the fittings are mounted on endpiece 21, and the hole 28 in its knuckle is aligned with the holes 30 and 32 in the knuckles 20a and 20b. Hole 20d in fitting 12 is aligned with hole 26 in endpiece 21 and fittings 10 and 12 are held in assembled relationship with respect to endpiece 21 by means of a screw 34 which passes through hole 20d (Figure 2) and threads into barrel 25. It will be noted that barrel 25 does not extend all the way through the endpiece, and thus when screw 34 is tightened, fittings 10 and 12 are drawn tightly against the front and rear surfaces of endpiece 21. It will thus be seen that the fittings 10 and 12 are interlocked and securely connected to the endpiece 21. Furthermore, when the hinge pin connects the fittings 10 and 12, these fittings are further interlocked.

The forward end of temple 24 consists of a metal tube of oval shape in cross section (Figure 4). The rear end of plate 22 of fitting 14 extends into the forward end of temple 24 and is soldered therein. Temple 24 includes a tongue portion 24a (Figures 2 and 5) extending forwardly from the front end of the temple on the outside there of so that when the temple 24 is in an open position as viewed in Figure 2, the forward end of tongue 24a abuts against the rear end of cover plate 16. These parts thus coact to form a limit stop limiting the degree which the temples may be spread. The outer surfaces of fitting 16 and temple 24 also form a continuous surface which is neat and attractive in appearance, the fittting 16 blending into the temple.

A pair of hinge knuckles 22a and 22b are formed on the forward portion of and extend inwardly from plate 22. The top and bottom faces of knuckles 22a and 22b are so spaced that they fit within the opposed faces of knuckles 20a and 20b (Figure 3) while knuckle 18a on tongue portion 18 fits between the opposed faces of knuckles 22a and 22b. When the holes in the knuckles are aligned, they are hingedly connected by means of a screw 40. The lower end of screw 40 threads into hole 32 in knuckle 20b (Figure 5). Thus, it will be seen that the screw 40 connects all of the fittings, forming an interlocked unit of them.

Thus, a practical and efficient hinge construction has been disclosed, in which all of the fittings coact to produce a strong and durable hinge for non-metallic frames. Strains produced by spreading the temples are absorbed by both fittings 10 and 12, fitting 12 placing a definite limit on the forward thrust that can be placed on fitting 10. Because of the interlocking fittings 10 and 12, twisting strains are also absorbed by both of these fittings. Thus, a strong and durable hinge structure has been disclosed in which the several objects hereinabove mentioned as well as many others are successfully accomplished.

As many possible embodiments may be made of the above invention, and as many changes might be made in the embodiment above set forth, it is to be understood that all matter hereinabove set forth or described in the accompanying drawings is to be interpreted as illustrative and not in a limiting sense.

What is claimed is:

1. In non-metallic eyeglass frame construction, in combination, a non-metallic eyeglass frame front including a pair of endpiece portions, a pair of temples, and a pair of hinges connecting said temples to the endpiece portions of said frame front, each endpiece portion having a horizontally positioned slot therein, each hinge including a metal fitting having a reinforcing member thereon extending through the slot in one of said endpiece portions, a hinge knuckle formed on the rear end of said reinforcing member, a second metal fitting mounted on the rear side of said last-mentioned endpiece portion, hinge knuckles formed on said second fitting, means passing through said last-mentioned endpiece portion connecting said fittings to said endpiece portion, a third fitting connected to one of said temples, hinge knuckles formed on said third fitting and pin means for pivotally connecting the knuckles on said fittings.

2. In non-metallic eyeglass frame construction, in combination, a non-metallic eyeglass frame front including a pair of endpiece portions, a pair of temples, and a pair of hinges connecting said temples to the endpiece portions of said frame front, each endpiece portion having a horizontally positioned slot therein, each hinge including a metal fitting having a reinforcing member thereon extending through the slot in one of said endpiece portions, a hinge knuckle formed on the rear end of said reinforcing member of said metal fitting, an internally threaded member, means securing said member to said metal fitting, said internally threaded member extending rearwardly into said endpiece portion, a second metal fitting mounted on the rear side of said endpiece portion, hinge knuckles formed on said second fitting, a screw passing through said second fitting and threading into said internally threaded member on said first-mentioned fitting, said screw securing said first and second-mentioned fittings to said endpiece portion, a third fitting connected to one of said temples, knuckles formed on said third fitting, and pin means pivotally connecting the knuckles on said fittings.

3. In non-metallic eyeglass frame construction, in combination, a non-metallic eyeglass frame front including a pair of endpiece portions, a pair of temples, and a pair of hinges connecting said temples to the endpiece portions of said frame front, each endpiece portion having a horizontally positioned slot therein, each hinge including a metal fitting having a cover plate and a reinforcing member, said cover plate having its rear surface abutting against and following the forward surface of one of said endpiece portions, said reinforcing member being flat, horizontally positioned and secured along its outer edge to said cover plate, said reinforcing member extending through the slot in said last-mentioned endpiece portion, hinge knuckle means formed on the rear end of said reinforcing member, a second metal fitting mounted on the rear side of said last-mentioned endpiece portion, a slot formed in said second fitting, said reinforcing member extending through said slot, hinge knuckles means formed on said second fitting, means passing through said last-mentioned endpiece portion connecting said fittings to said endpiece portion, a third fitting connected to one of said temples, hinge knuckle means formed on said third fitting and pin means for pivotally connecting said knuckles on said fittings.

4. In non-metallic eyeglass frame construction, in combination, a non-metallic eyeglass frame front including a pair of endpiece portions, a pair of temples and a pair of hinges connecting said temples to the endpiece portions of said frame front, each endpiece portion having a horizontally positioned slot therein, each hinge including a metal fitting having a cover plate and a reinforcing member, said cover plate having its rear surface abutting against and following the forward surface of one of said endpiece portions, said reinforcing member being flat, horizontally positioned and secured along its outer edge to said cover plate, said reinforcing member extending through the slot in said last-mentioned endpiece portion, hinge knuckle means formed on the rear end of said reinforcing member, a second metal fitting mounted on the rear side of said last-mentioned endpiece portion, a slot formed in said second fitting, said reinforcing member extending through said slot, hinge knuckle means formed on said second fitting, means forming a hole extending through said last-mentioned endpiece portion from the front to the rear surface thereof, an internally threaded cylindrically-shaped member secured to said first-mentioned fitting and extending into said hole, a screw passing through said second fitting and threading into said last-mentioned member, said screw securing said fittings to said last-mentioned endpiece portion, a third fitting secured to one of said temples, hinge knuckle means formed on said third fitting, and a pivot pin connecting said knuckle means.

BERYL B. KNOWLES.
MARTIN B. SINGER.

References Cited in the file of this patent

UNITED STATES PATENTS

| Number | Name | Date |
|---|---|---|
| 2,051,542 | Colliander | Aug. 18, 1936 |
| 2,270,338 | Person | Jan. 20, 1942 |
| 2,326,971 | Rey | Aug. 17, 1943 |

FOREIGN PATENTS

| Number | Country | Date |
|---|---|---|
| 438,946 | Great Britain | Nov. 26, 1935 |
| 456,211 | Great Britain | Nov. 4, 1936 |